US008739744B2

(12) United States Patent
Charnesky et al.

(10) Patent No.: US 8,739,744 B2
(45) Date of Patent: Jun. 3, 2014

(54) COMPOUND SHUTTER SYSTEM

(75) Inventors: Scott P. Charnesky, Birmingham, MI (US); Kyle C. Smith, Hazel Park, MI (US); Jeffrey L. Konchan, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 12/878,343

(22) Filed: Sep. 9, 2010

(65) Prior Publication Data

US 2012/0060776 A1    Mar. 15, 2012

(51) Int. Cl.
*B60K 11/08*  (2006.01)
*F01P 7/12*  (2006.01)
*E06B 7/08*  (2006.01)

(52) U.S. Cl.
CPC .............. *B60K 11/085* (2013.01); *B60K 11/08* (2013.01); *F01P 7/12* (2013.01); *E06B 7/08* (2013.01)
USPC ................... 123/41.05; 123/41.04; 123/41.07; 160/115; 160/236

(58) Field of Classification Search
CPC ............ B60H 1/00; B60H 1/34; B60H 11/04; B60H 11/08; B60H 11/085; F01P 7/10; F01P 7/12
USPC ............................................. 123/41.04, 41.05
See application file for complete search history.

(56) References Cited

U.S. PATENT DOCUMENTS

| | | | | | |
|---|---|---|---|---|---|
| 1,393,917 | A | * | 10/1921 | Snell | 165/98 |
| 1,471,510 | A | * | 10/1923 | Willis | 123/41.05 |
| 1,523,541 | A | * | 1/1925 | Irving | 236/35.3 |
| 1,576,507 | A | * | 3/1926 | Eliasek | 165/98 |
| 1,817,398 | A | * | 8/1931 | See | 123/41.04 |
| 1,932,244 | A | * | 10/1933 | Green | 49/77.1 |
| 1,964,059 | A | * | 6/1934 | Horton | 123/41.05 |
| 3,064,632 | A | * | 11/1962 | Frank | 123/41.04 |
| 3,543,838 | A | * | 12/1970 | White | 62/160 |
| 3,759,054 | A | * | 9/1973 | Graber | 62/183 |
| 4,064,934 | A | * | 12/1977 | Kolthoff, Jr. et al. | 165/97 |
| 4,312,381 | A | * | 1/1982 | Ratner | 137/636 |
| 4,457,558 | A | * | 7/1984 | Ishikawa | 296/180.5 |
| 4,549,504 | A | * | 10/1985 | Gaines et al. | 123/41.01 |
| 5,732,666 | A | * | 3/1998 | Lee | 123/41.05 |
| 7,182,047 | B1 | * | 2/2007 | Schwartz | 123/41.04 |
| 2008/0178526 | A1 | * | 7/2008 | Browne et al. | 49/82.1 |
| 2010/0147611 | A1 | * | 6/2010 | Amano et al. | 180/68.1 |
| 2012/0132474 | A1 | * | 5/2012 | Charnesky et al. | 180/68.1 |

* cited by examiner

*Primary Examiner* — Lindsay Low
*Assistant Examiner* — Kevin Lathers
(74) *Attorney, Agent, or Firm* — Quinn Law Group, PLLC

(57) ABSTRACT

A compound shutter system includes a first shutter assembly having at least one louver operable to selectively open and close the first shutter assembly. The compound shutter system also includes a second shutter assembly disposed remotely from the first shutter assembly. The second shutter assembly includes at least one louver operable to selectively open and close the second shutter assembly. The compound shutter system additionally includes a drive element. The drive element operatively connects the first shutter assembly and the second shutter assembly and automatically coordinates operation of the first and second shutter assemblies. A vehicle employing the compound shutter system is also disclosed.

13 Claims, 3 Drawing Sheets

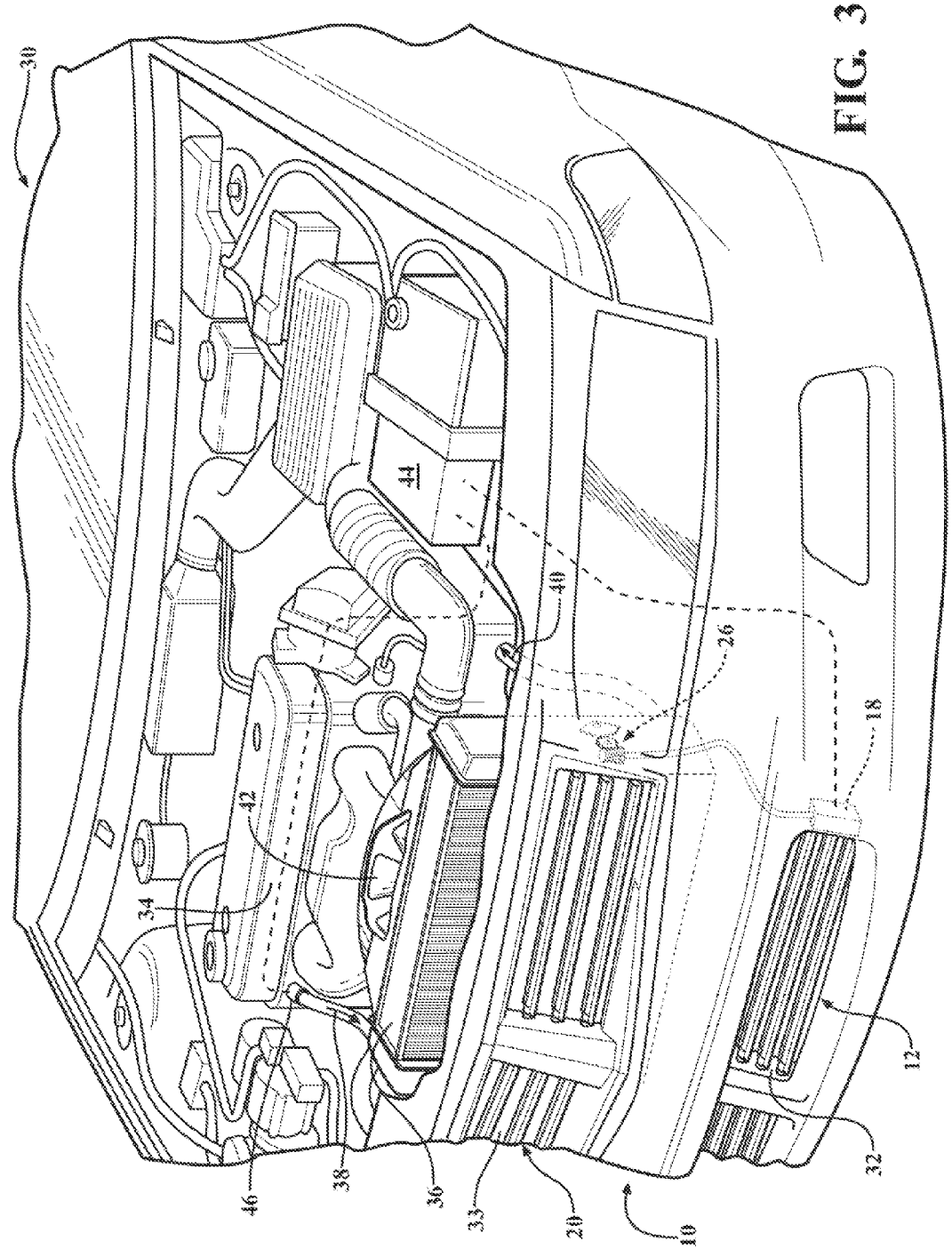

COMPOUND SHUTTER SYSTEM

TECHNICAL FIELD

The invention relates to a compound shutter system.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

SUMMARY

A compound shutter system includes a first shutter assembly having at least one louver operable to selectively open and close the first shutter assembly. The compound shutter system also includes a second shutter assembly disposed remotely from the first shutter assembly. The second shutter assembly includes at least one louver operable to selectively open and close the second shutter assembly. The compound shutter system additionally includes a drive element. The drive element operatively connects the first shutter assembly and the second shutter assembly and automatically coordinates operation of the first and second shutter assemblies.

The shutter system may also include a mechanism configured to operate the first shutter assembly between and inclusive of fully opened and fully closed positions, and via the drive element to operate the second shutter assembly between and inclusive of fully opened and fully closed positions. The mechanism may operate the first shutter assembly in a predetermined direction between the fully opened and fully closed positions, while the drive element operates the second shutter assembly in a direction that is opposite the predetermined direction. The drive element may either be a push-pull or a torque-type cable, such that the cable operates the second shutter assembly automatically when the first shutter assembly is operated.

The shutter system may additionally include a controller configured to regulate the mechanism. The controller may be configured to regulate the mechanism to control an airstream in a vehicle through a first grille opening and through a second grille opening that is disposed remotely from the first grille opening. In such a configuration, the first shutter assembly may be disposed in the first grille opening and the second shutter assembly may be disposed in the second grille opening. Such a vehicle may include an internal combustion engine, while the controller may be configured to regulate the mechanism according to a load on the engine.

The engine may be cooled by a fluid circulated through a heat exchanger, and the vehicle may include a sensor adapted to sense a temperature of the fluid and configured to communicate the temperature to the controller. The controller may be configured to regulate the mechanism to cool the fluid circulated through the heat exchanger according to the sensed temperature of the fluid.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a partial perspective view of a vehicle having the shutter system shown in FIGS. 1 and 2.

DETAILED DESCRIPTION

Figure 1:
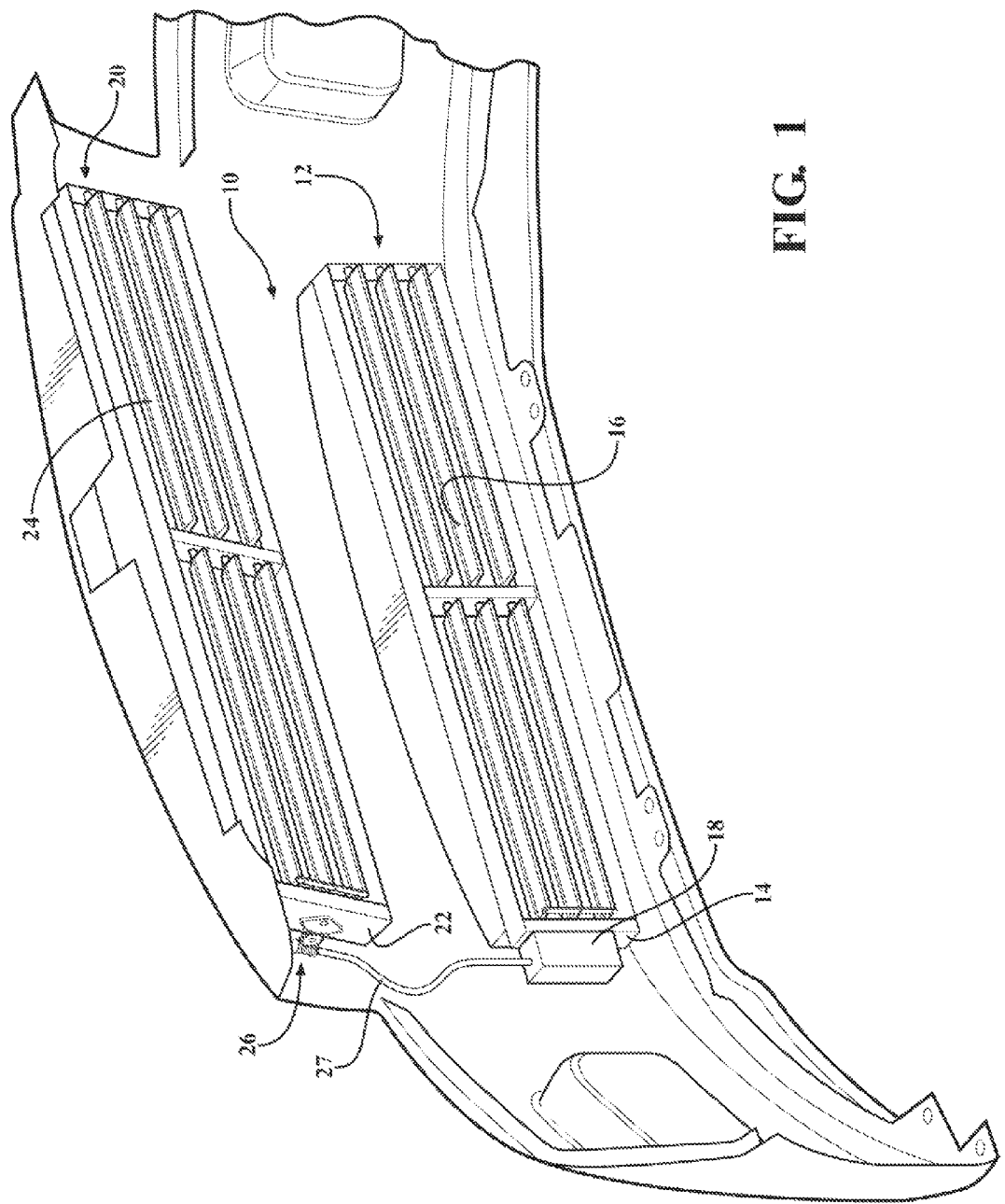
FIG. 1 is a partial perspective view of a compound shutter system according to a first embodiment.

Referring to the drawings, wherein like reference numbers refer to like components, FIG. 1 shows a compound shutter system 10 according to a first embodiment. Shutter system 10 includes a first shutter assembly 12 and a second shutter assembly 20. First shutter assembly 12 includes a rigid frame 14 and a first set of louvers 16 operable to selectively open and close the first shutter assembly. A mechanism 18 is operatively connected to first shutter assembly 12, and is configured to operate the first shutter assembly by rotating louvers 16 through a range between and inclusive of a fully opened and a fully closed position. Mechanism 18 may include an electric motor (not shown).

Second shutter assembly 20 includes a rigid frame 22 and a second set of louvers 24 operable to selectively open and close the second shutter assembly. Similar to louvers 16, louvers 24 may be rotated through a range between and inclusive of a fully opened and a fully closed position of shutter assembly 20. Second shutter assembly 20 also includes a gear drive arrangement 26. Gear drive arrangement 26 is employed to receive external drive from a drive element 27 and convert such external drive to rotation of louvers 24. Drive element 27 may be a torque-type cable, i.e., a cable that is configured to accept torsional loads without significant twist, to thereby transmit drive from first shutter assembly 12 to second shutter assembly 20. Such a torque-type cable may be produced from any suitable material or a combination of materials, and a flat-wrap cable conduit may also be employed.

Drive element 27 operatively connects first shutter assembly 12 and second shutter assembly 20. Drive element 27 automatically coordinates operation of the respective first and second shutter assemblies 12, 20, such that when the first set of louvers 16 is operated through its range, the second set of louvers 24 is also operated through its respective range. Shutter system 10 may be configured to operate first shutter assembly 12 and second shutter assembly 20 in the same direction. In such a case, when mechanism 18 operates first shutter assembly 12 in a predetermined direction, for example from the closed to the opened position, drive element 27 operates second shutter assembly 20 in the same direction, i.e., from the closed to the opened position. Such operation of first and second shutter assemblies 12 and 20 may be accomplished through a simple gearing arrangement (not shown), thereby providing a direct transfer of rotation of louvers 24 to louvers 16.

Shutter system 10 may also be configured such that when mechanism 18 operates first shutter assembly 12 in a predetermined direction, for example from the closed to the opened position, drive element 27 is configured to operate second shutter assembly 20 in the opposite direction, i.e., from the opened to the closed position. Accordingly, to operate first and second shutters 12 and 20 in opposite directions, the second shutter assembly may be operated through a gearing arrangement with an idler gear (not shown) in order to change the direction of rotation of louvers 24 relative to the direction of rotation of louvers 16. Additionally, the operation of the first and second shutter assemblies 12 and 20 may be coordinated with a separate gearing arrangement (not shown) to provide a ratio between the rotation of the first shutter assembly and the rotation of the second shutter assembly. Such ratioed coordination of operation of the first and second shutter assemblies 12 and 20 may be employed for the first, as well as for the second embodiments of shutter system 10.

Figure 2:
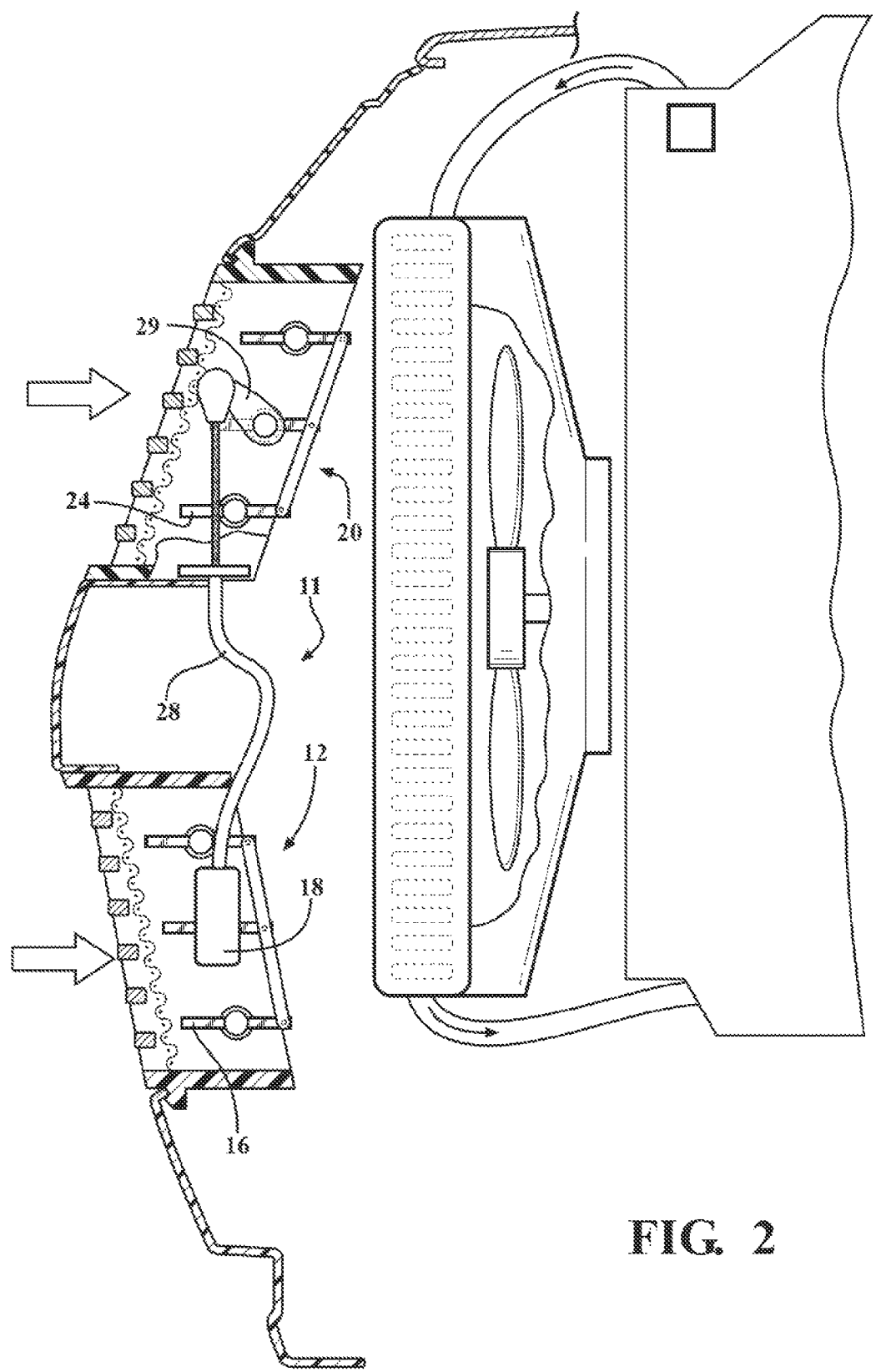
FIG. 2 is a partial perspective view of the compound shutter system according to a second embodiment.

FIG. 2 shows a compound shutter system 11 according to a second embodiment. Shutter system 11 is identical to shutter system 10 shown in FIG. 1, other than employing a drive element 28 for operation of the system. In the embodiment shown, drive element 28 is a push-pull type of a cable that connects first and second shutter assemblies 12, 20 and automatically coordinates operation of the first and second shutter assemblies. The drive element 28 may operate the second shutter assembly 20 by selectively pushing and pulling via a cam 29 or a lever arrangement (not shown) to automatically rotate louvers 24 when the first shutter assembly 12 is operated by mechanism 18. Drive element 27 of FIG. 1 and drive element 28 of FIG. 2 each permit the first and second shutter assemblies 12 and 20 to be located remotely from each other. Additionally, each of drive elements 27 and 28 permit operative automatic coordination of the first and second shutter assemblies 12 and 20 when the first and second shutter assemblies are physically separated by other structures and/or devices packaged in a vehicle 30 (shown in FIG. 3).

FIG. 3 depicts shutter system 10 incorporated inside vehicle 30 which includes a first grille opening 32 and a second grille opening 33. As shown, shutter assembly 12 is disposed in first grille opening 32 and shutter assembly 20 is disposed in second grille opening 33. The positioning of shutter assemblies 12 and 20 may also be switched, such that shutter assembly 20 is disposed in first grille opening 32 and shutter assembly 12 is disposed in second grille opening 33. Both grille openings 32 and 33 are positioned at the front of the vehicle 30. Vehicle 30 includes an internal combustion engine 34. Also included is an air-to-fluid heat exchanger 36, i.e., a radiator, for circulating a cooling fluid, shown by arrows 38 and 40, such as water or a specially formulated coolant, for cooling engine 34. Heat exchanger 36 is positioned behind the grille opening 32 and behind shutter system 10, such that the heat exchanger may be shielded from various road- and air-borne debris. Heat exchanger 36 may also be positioned in any other location, such as behind a passenger compartment, if, for example, the vehicle has a rear or a mid-engine configuration, as understood by those skilled in the art.

A fan 42 is positioned behind heat exchanger 36. Fan 42 may be driven directly by engine 34, either electrically or mechanically. Vehicle 30 also includes a controller 44, which may be an engine controller or a separate control unit, configured to regulate mechanism 18 for selecting the desired position of shutter system 10. Controller 44 may also be configured to operate fan 42, if the fan is electrically driven, and a thermostat (not shown) that is configured to regulate the circulation of coolant, as understood by those skilled in the art.

Vehicle 30 additionally includes a coolant sensor 46 configured to sense a temperature of the coolant. Controller 44 is programmed to regulate mechanism 18 according to the load on engine 34 and, correspondingly, on the temperature of the coolant sensed by sensor 46. The temperature of the coolant is increased due to the heat produced by engine 34 under load. Typically, a load on the engine is dependent on operating conditions imposed on vehicle 30, such as going up a hill and/or pulling a trailer. The load on engine 34 generally drives up internal temperature of the engine, which in turn necessitates cooling of the engine for desired performance and reliability.

The coolant is routed inside engine 34 in order to most effectively remove heat from critical engine components, such as bearings (not shown, but known by those skilled in the art). Typically, the coolant is continuously circulated by a fluid pump (not shown) from engine 34 to heat exchanger 36. In a moving vehicle, an airstream at ambient temperature and traveling at a certain velocity with respect to the vehicle penetrates the vehicle's grille opening 32. When shutter system 10 is open, the airstream penetrates the shutter system plane before coming into contact with heat exchanger 36. As the airstream reaches heat exchanger 36, the coolant temperature inside the heat exchanger is reduced before the coolant is returned to engine 34, to thereby cool the engine.

When the shutter system 10 is fully closed, louvers 16 and 24 provide blockage of the airstream at grille openings 32 and 33, respectively. When shutter system 10 is fully opened, as shown in FIG. 3, louvers 16 and 24 are rotated to a position parallel to the airstream seeking to penetrate the shutter system plane. Thus, a fully opened shutter system 10 is configured to permit a generally unfettered passage of such a stream through the louver plane. Shutter system 10 may also be regulated by controller 44 to variably restrict access of the oncoming airstream to heat exchanger 36, by providing coordinated operation of first shutter assembly 12 and second shutter assembly 20 via drive element 27.

An intermediate position may be selected for first shutter assembly 12 and/or second shutter assembly 20, where the respective louvers 16 and/or 24 are partially closed. Such ability to set a coordinated position for each of the first and second shutter assemblies 12 and 20 permits finer control of the amount of the airstream received by the heat exchanger 36. An appropriate coordinated position of louvers 16 and 24 is selected by controller 44 according to a programmed algorithm to thereby affect the desired cooling of engine 34, as well as to generate the most favorable aerodynamic performance of vehicle 30.

While the best modes for carrying out the invention have been described in detail, those familiar with the art to which this invention relates will recognize various alternative designs and embodiments for practicing the invention within the scope of the appended claims.

The invention claimed is:

1. A compound shutter system comprising:
  a first shutter assembly having at least one louver operable to selectively open and close the first shutter assembly;
  a second shutter assembly disposed remotely from the first shutter assembly, and having at least one louver operable to selectively open and close the second shutter assembly;
  a drive element, wherein the drive element operatively connects the first shutter assembly and the second shutter assembly and automatically coordinates operation of the first and second shutter assemblies;
  a mechanism configured to coordinate simultaneous, non-sequential operation of the first shutter assembly and the second shutter assembly, wherein the first shutter assembly is operated between and inclusive of a fully opened and a fully closed position in a predetermined direction, and the second shutter assembly is operated via the drive element between and inclusive of a fully opened and a fully closed position in a direction that is opposite the predetermined direction; and an electronic controller programmed to regulate the mechanism.

2. The shutter system of claim 1, wherein the drive element is a push-pull cable which operates the second shutter assembly automatically when the first shutter assembly is operated.

3. The shutter system of claim 1, wherein the drive element is a torque-type cable which operates the second shutter assembly automatically when the first shutter assembly is operated.

4. The shutter system of claim 1, wherein the controller regulates the mechanism to control an airstream in a vehicle through a first grille opening and through a second grille opening that is disposed remotely from the first grille opening, such that the first shutter assembly is disposed in the first grille opening and the second shutter assembly is disposed in the second grille opening.

5. The shutter system of claim 4, wherein the vehicle includes an internal combustion engine, and the controller is configured to regulate the mechanism according to a load on the engine.

6. The shutter system of claim 5, wherein the engine is cooled by a fluid circulated through a heat exchanger, and the vehicle includes a sensor adapted to sense a temperature of the fluid and configured to communicate the temperature to the controller.

7. The shutter system of claim 6, wherein the controller is configured to regulate the mechanism to cool the fluid circulated through the heat exchanger according to the sensed temperature of the fluid.

8. A vehicle comprising:
an internal combustion engine cooled by a circulating fluid;
a heat exchanger configured to cool the fluid via an airstream after the fluid cools the engine;
a first grille opening and a second grille opening, wherein the second grille opening is disposed remotely from the first grille opening and each grille opening is positioned to permit the airstream to pass through on the way to the heat exchanger; and
a compound shutter system for controlling an airstream through the first and second grille openings, the shutter system including:

a first shutter assembly disposed in the first grille opening and having at least one louver operable to selectively open and close the first shutter assembly;
a second shutter assembly disposed in the second grille opening and having at least one louver operable to selectively open and close the second shutter assembly;
a drive element, wherein the drive element operatively connects the first shutter assembly and the second shutter assembly and automatically coordinates operation of the first and second shutter assemblies;
a mechanism configured to coordinate simultaneous, non-sequential operation of the first shutter assembly and the second shutter assembly, wherein the first shutter assembly is operated between and inclusive of a fully opened and a fully closed position in a predetermined direction, and the second shutter assembly is operated via the drive element between and inclusive of a fully opened and a fully closed position in a direction that is opposite the predetermined direction; and
an electronic controller programmed to regulate the mechanism in response to a temperature of the fluid.

9. The vehicle of claim 8, wherein the drive element is a push-pull cable, and the push-pull cable operates the second shutter assembly automatically when the first shutter assembly is operated.

10. The vehicle of claim 8, wherein the drive element is a torque-type cable, and the torque-type cable operates the second shutter assembly automatically when the first shutter assembly is operated.

11. The vehicle of claim 8, wherein the controller is configured to regulate the mechanism according to a load on the engine.

12. The vehicle of claim 11, wherein the vehicle includes a sensor adapted to sense the temperature of the fluid and configured to communicate the temperature to the controller.

13. The vehicle of claim 12, wherein the controller is configured to regulate the mechanism to cool the fluid circulated through the heat exchanger according to the sensed temperature of the fluid.

* * * * *